(12) United States Patent
Hsu et al.

(10) Patent No.: US 9,605,739 B2
(45) Date of Patent: Mar. 28, 2017

(54) POWER TRANSMISSION SYSTEM (71) Applicant: GPOUER CO., LTD., New Taipei (TW)

(72) Inventors: Tsang-Lin Hsu, New Taipei (TW); Jung-Feng Yeh, New Taipei (TW); Jau-Huai Lu, New Taipei (TW); Tien-Tung Chung, New Taipei (TW); Jian-Hung Lin, New Taipei (TW); Chia-Chun Liu, New Taipei (TW)

(73) Assignee: GPOUER CO., LTD., New Taipei (TW)

( * ) Notice: Subject to any disclaimer, the term of this patent is extended or adjusted under 35 U.S.C. 154(b) by 412 days.

(21) Appl. No.: 14/251,562

(22) Filed: Apr. 11, 2014

(65) Prior Publication Data

US 2015/0292609 A1  Oct. 15, 2015

(51) Int. Cl.
| F16D 31/02 | (2006.01) |
| F16H 47/02 | (2006.01) |
| B60K 7/00 | (2006.01) |
| B60K 17/04 | (2006.01) |
| F01C 1/12 | (2006.01) |
| F16H 61/40 | (2010.01) |
| F16H 57/02 | (2012.01) |

(52) U.S. Cl.
CPC ........... *F16H 47/02* (2013.01); *B60K 7/0015* (2013.01); *B60K 7/0023* (2013.01); *B60K 17/043* (2013.01); *F01C 1/123* (2013.01); *F16H 57/02* (2013.01); *F16H 61/40* (2013.01)

(58) Field of Classification Search
CPC .......... B60K 7/0015; B60K 2007/0092; B60K 17/043; F01C 1/123; F01C 1/084
See application file for complete search history.

(56) References Cited

U.S. PATENT DOCUMENTS 2,918,907 A * 12/1959 Hausmann ........... B60K 7/0015
   180/308
6,364,642 B1 * 4/2002 Garczorz .............. F04C 18/123
   418/15

* cited by examiner

*Primary Examiner* — Michael Leslie
(74) *Attorney, Agent, or Firm* — Cheng-Ju Chiang (57) ABSTRACT

A power transmission system comprises a transmission device, and a power supply device which powers the transmission device, wherein the transmission device comprises a cavity having a body, covers, an inlet and an outlet; at least a pair of rotors and a gear set that are assembled in the cavity; and a transmission shaft pivotally connected with the pair of rotors and the gear set; the power supply device comprises a power equipment available for transmitting a working fluid; shaft adapters connected with the inlet and the outlet of the cavity; and a connecting pipe connected between the power equipment and the shaft adapter; the working fluid is transmitted by the connecting pipe from the power equipment to the inlet of the cavity to provide the pair of rotors with normal force for radial motion in a reverse rotation direction and make pressure in the cavity increased.

8 Claims, 10 Drawing Sheets

POWER TRANSMISSION SYSTEM

BACKGROUND OF THE INVENTION

1. Field of the Invention

The present invention relates to a power transmission system, and more particularly to a system that as able to transmit power produced by working fluid in an efficient way and provide high-lift transmission effect in accordance with the transmitted power.

2. The Related Art

Power comes from energy conversion involving different conversion amount and speed rate. The common power transmission is provided by transmission shaft to transmit power to specific components or equipments, so that amount of work can directly affect performance of the specific components or equipments. Common power driver includes engine, vacuum pump, internal combustion engine, compressor, etc., by which working fluid produces power during its transmission and then the power is transmitted from the transmission shaft to the specific components or equipments, e.g., fans or gear set, that is, the work done by the transmission shaft provides a power source needed by the specific components or equipments for other following predetermined processes, such as driving fans to produce winds, driving gear sets for power transmission, driving tires for vehicles to move, or etc.

However, for the power transmission from the transmission shaft to the specific components or equipments, there are still some flaws in the specific components or equipments during the operation for energy formation, which often prevents efficiency of power transmission from being promoted, for example, the traditional equipments could not emit the accumulated exhaust gas thoroughly generated from the incomplete emission of exhaust gas; as a result, power transmission is less efficient than expected, which may shorten the operation life indirectly. Even though the supercharging operation is made in use, the exhaust gas remains thereamong. Moreover, some certain equipment, such as centrifugal pump, is in use limited by lift due to less efficiency, so that problem of net positive suction head (NPSH) should be also taken into consideration, i.e., the suction inlet of the equipment needs to be disposed at some proper depth below the fluid surface, otherwise the cavitation phenomenon would occur and negatively affect performance of suction and transmission, actually which may lead to inconvenience of installation in practice.

SUMMARY OF THE INVENTION

Accordingly, an object of the present invention is to provide a power transmission system, which provides a power transmission in an efficient way so that performance on the efficiency of the power transmission may be improved, and the exhaust gas accumulation and lift limitation may be eliminated.

Another object of the present invention is to provide a power transmission system having pressure at 1 atm., for the high-lift transmission effect that is good for actual installation.

To attain this, the power transmission system comprises a transmission device, and a power supply device which powers the transmission device, wherein the transmission device comprises a cavity having a body, covers, an inlet and an outlet; at least a pair of rotors and a gear set that are assembled in the cavity; and a transmission shaft pivotally connected with the pair of rotors and the gear set; the power supply device comprises a power equipment available for transmitting a working fluid; shaft adapters connected with the inlet and the outlet of the cavity; and a connecting pipe connected between the power equipment and the shaft adapter; the working fluid is transmitted by the connecting pipe from the power equipment to the inlet of the cavity to provide the pair of rotors with normal force for radial motion in a reverse rotation direction and make pressure in the cavity increased, by which the transmission shaft begins to do work to produce energy that is coaxially transmitted by the gear set for the efficient power transmission of the working fluid.

Accordingly, the pair of rotors comprises a rotor and a conjugate rotor intermeshed with each other, both of which have same structure; the gear set comprises a first gear and a second gear intermeshed with each other.

Accordingly, there are at least two of the pair of rotors of the transmission device which are series or parallel connected with each other.

DESCRIPTION OF THE PREFERRED EMBODIMENTS

Figure 1:
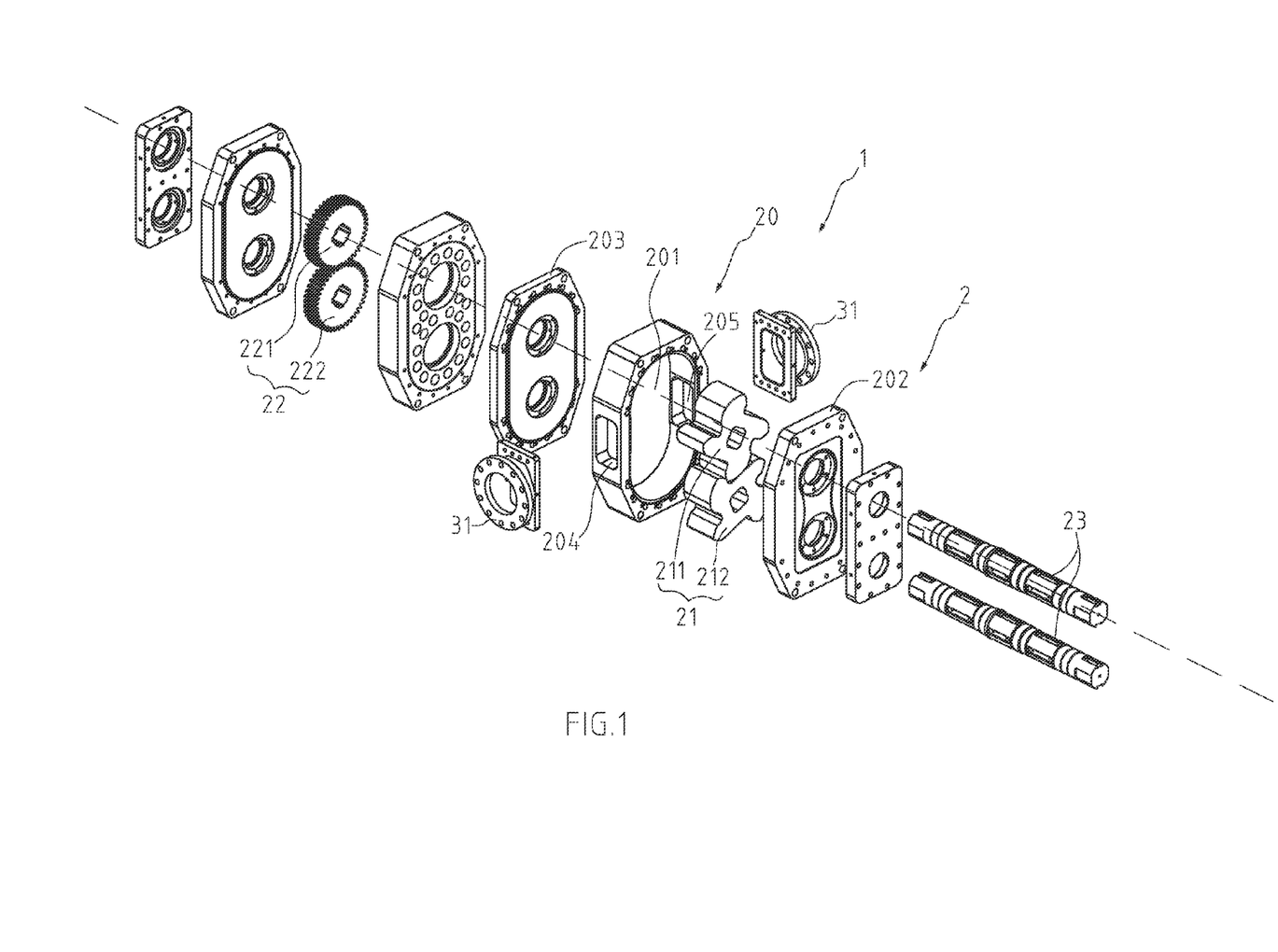
FIG. 1 is a perspective view of the power transmission system illustrating the first embodiment.
Figure 2:
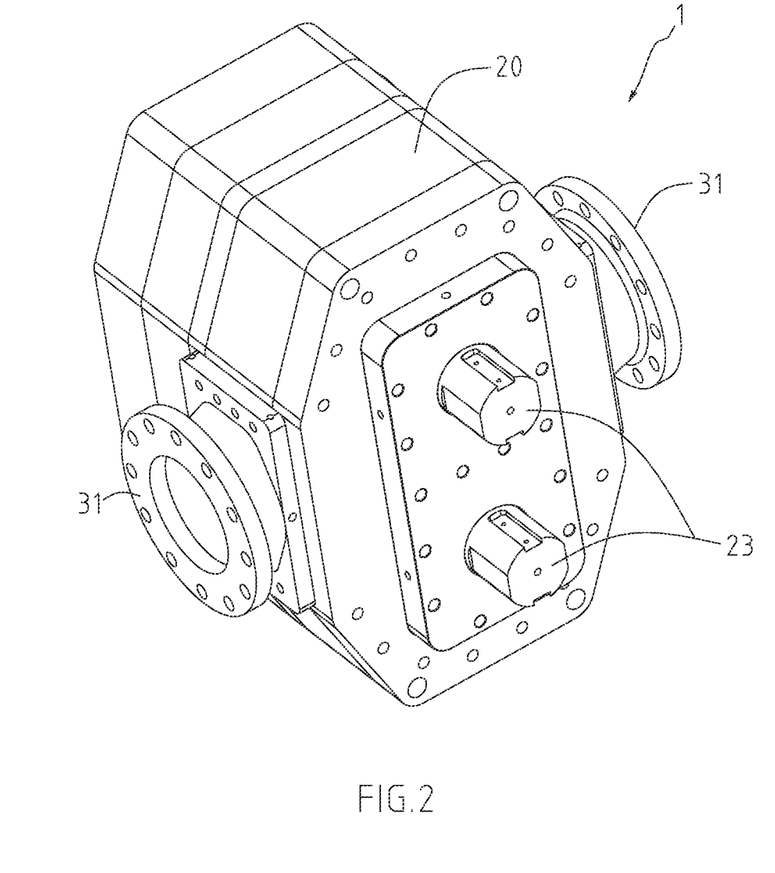
FIG. 2 is an assembly diagram illustrating the first embodiment.

Please referring to FIG. 1 and FIG. 2, as shown, power transmission system 1 in accordance with the present invention comprises a transmission device 2, and a power supply device 3 which powers the transmission device 2, wherein the transmission device 2 further comprises a cavity 20, a pair of rotors 21, a gear set 22, and a transmission shaft 23. The cavity 20 has a body 201, covers 202, 203, an inlet 204 and an outlet 205, wherein the inlet 204 and the outlet 205 are defined on the body 201; the inlet 204 provides the inflow of working fluid into the cavity 20, while the outlet 205 provides the outflow of working fluid from the cavity 20. The gear set 22 comprises a first gear 221 and a second gear 222 intermeshed with each other, both of which have same number of teeth and belong to a spur gear (or a helical gear).

The power supply device 3 (referring to FIG. 3) comprises a power equipment 30 available for transmitting a working fluid, and shaft adapters 31 connected with the inlet 204 and the outlet 205 of the cavity 20, and further comprises a connecting pipe 32 connected between the power equipment 30 and the shaft adapter 31, wherein the power equipment 30 may employ either hydraulic power or pneumatic power, and include motor, pump, fluid storage tank and fluid compressor. When working fluid enters into the inlet 204 through the connecting pipe 32 and the shaft adapter 31, the pair of rotors 21 that is originally stationary begins to be driven to move as pressure of the working fluid goes to high. The working fluid thus flows toward the outlet 205 along with the rotation direction of the first and second gears 221, 222, just as the efficient power transmission of the working fluid.

Figure 3:
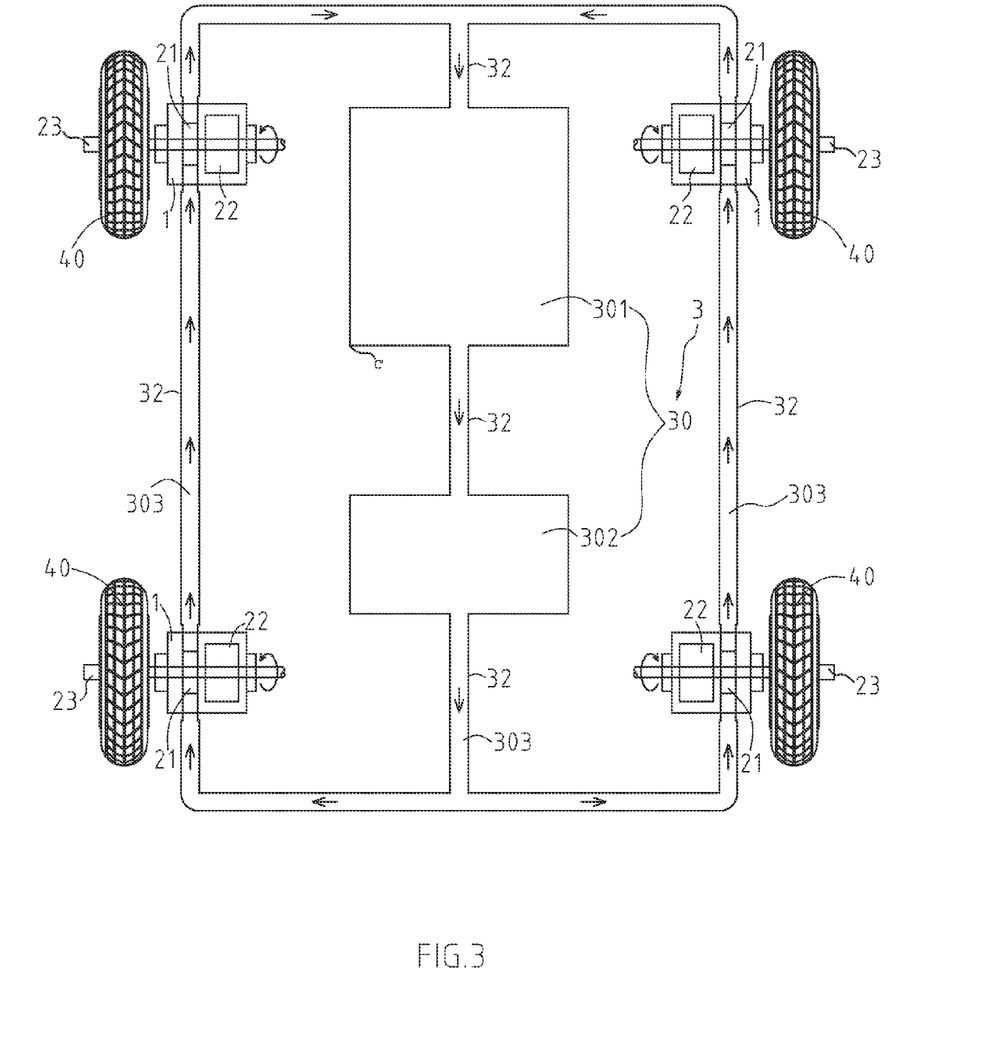
FIG. 3 is a schematic view illustrating the first embodiment applied to power transmission of vehicle.
Figure 4:
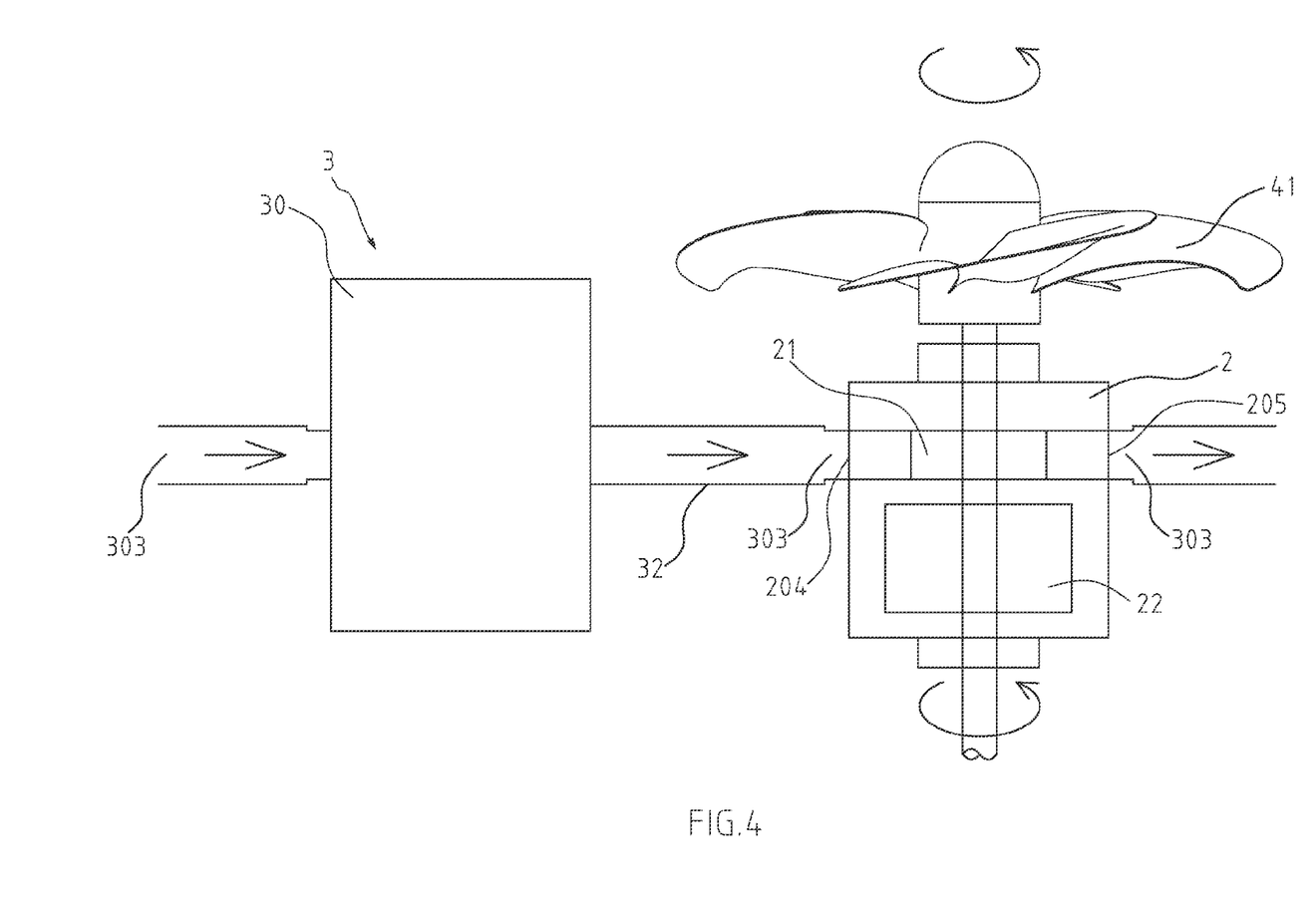
FIG. 4 is a schematic view illustrating the first embodiment applied to power transmission of fans.

Please referring FIG. 3 in the combination of FIG. 1 and FIG. 2, the power equipment 30 of the power supply device 3 employs a motor (not shown), a fluid storage tank 301 and a fluid compressor 302, by which a working fluid 303 (in liquid or gas form) originally stored in the fluid storage tank 301 is transmitted to the transmission device 2 through the pump or the fluid compressor 302, respectively. Moreover, when a vehicle remains stationary, the friction force between tires 40 and road keeps in the maximum, and the volume of the body 201 that accommodates the pair of rotors 21 is changeless before the pair of rotors 21 rotates. The fluid compressor 302 now begins to continuously push the working fluid 303 into the body 201 having a constant volume, which provides the pair of rotors 21, involving the rotor 211 and the conjugate rotor 212, with normal force for radial motion in a reverse rotation direction. With the pressure inside the body 201 getting higher, the force acting on surface of the pair of rotors 21 gets larger, and accordingly, the normal force that initiates the radial motion of the pair of rotors 21 thus gets larger. As the normal force being larger than the static friction force between the tires 40 and road, the tires 40 begins to rotate, that is, the transmission shaft 23 begins to do work. Meanwhile, the volume of the body 201 that accommodates the pair of rotors 21 begins to expand, while the pressure thereof begins to drop down; as thus, the energy previously stored at high pressure is supplied for the rotation of tires 40 as work. Therefore, when the working fluid 303 flows via the inlet 204 to the outlet 205, the pressure goes down to 1 atm., which means energy has completely outputted to the tires 40, so the pair of rotors 21 of the present invention utilized for power transmission are designed to avoid residual pressure at the outlet 205 to make sure that the energy is outputted completely, and to attain the purpose of efficient transmission of the power produced by the working fluid 303. In accordance with the above description and referring to FIG. 4, the working fluid 303 flows via the inlet 204 and the pair of rotors 21 into the outlet 205 to completely output the energy on the transmission shaft 23, and thus to make fans whirl.

Figure 5:
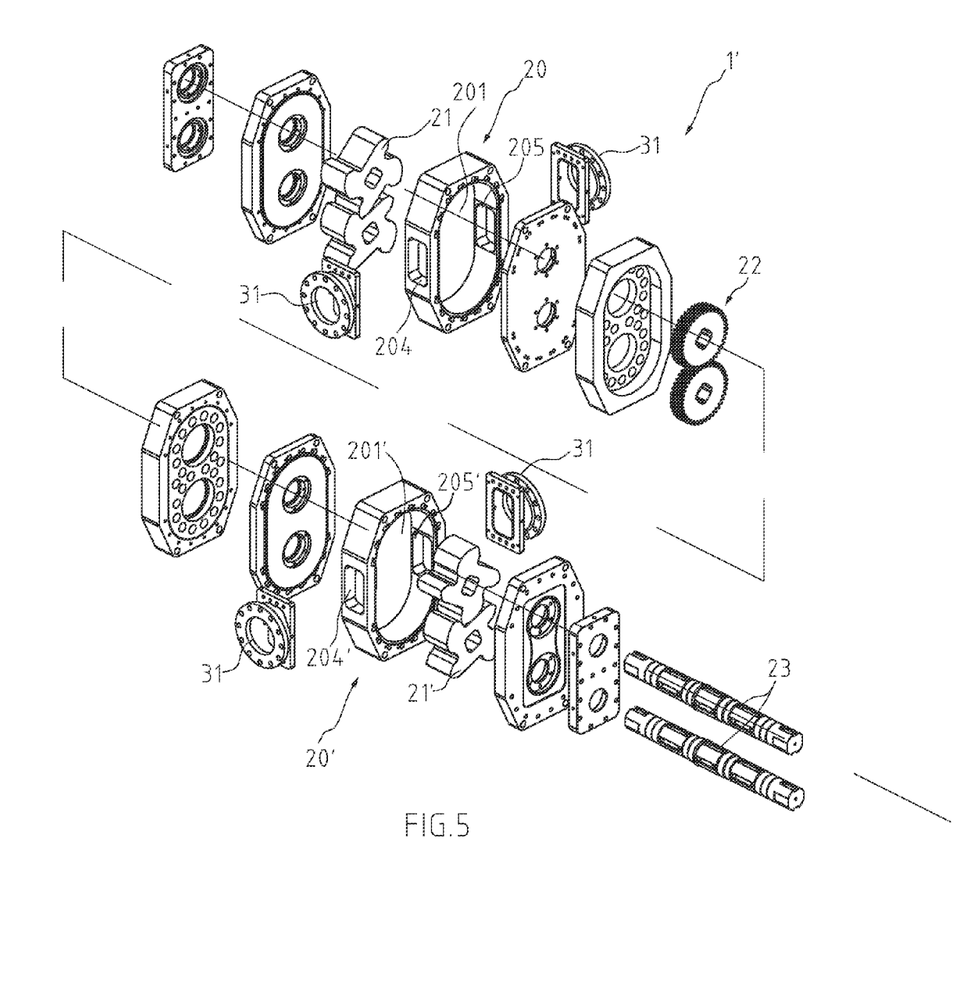
FIG. 5 is a perspective view illustrating the second embodiment.
Figure 6:
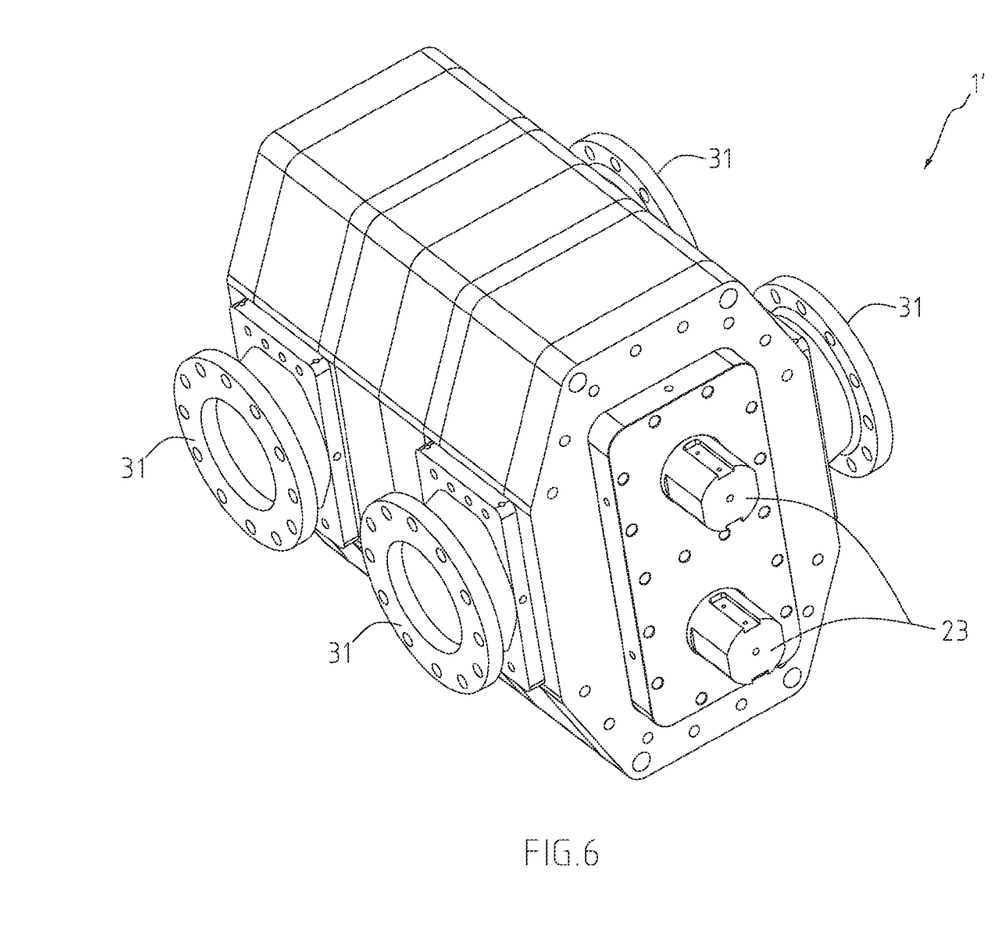
FIG. 6 is a perspective view of FIG. 1.

Please referring to FIG. 5 and FIG. 6, as shown, the difference between this embodiment and the first embodiment is that the pair of rotors of the transmission device 2 comprises a first pair of rotors 21 and a second pair of rotors 21' pivotally connected to each other in the form of axial series, and that the inlet 204,204' and the outlet 205,205' of the cavity 20, 20' come in pairs; series or parallel connection (described later) of the shaft adapters 31 are centered at the inlet 204,204' and the outlet 205,205', while other components remain the same as in the first embodiment. Therefore, power can be transmitted continuously and steadily and have high-lift effect by use of the power equipment 30 of the power supply device 3 with the first pair of rotors 21, the second pair of rotors 21' and the gear set 22 of the transmission device 2 as the auxiliary for power transmission.

Figure 7A:
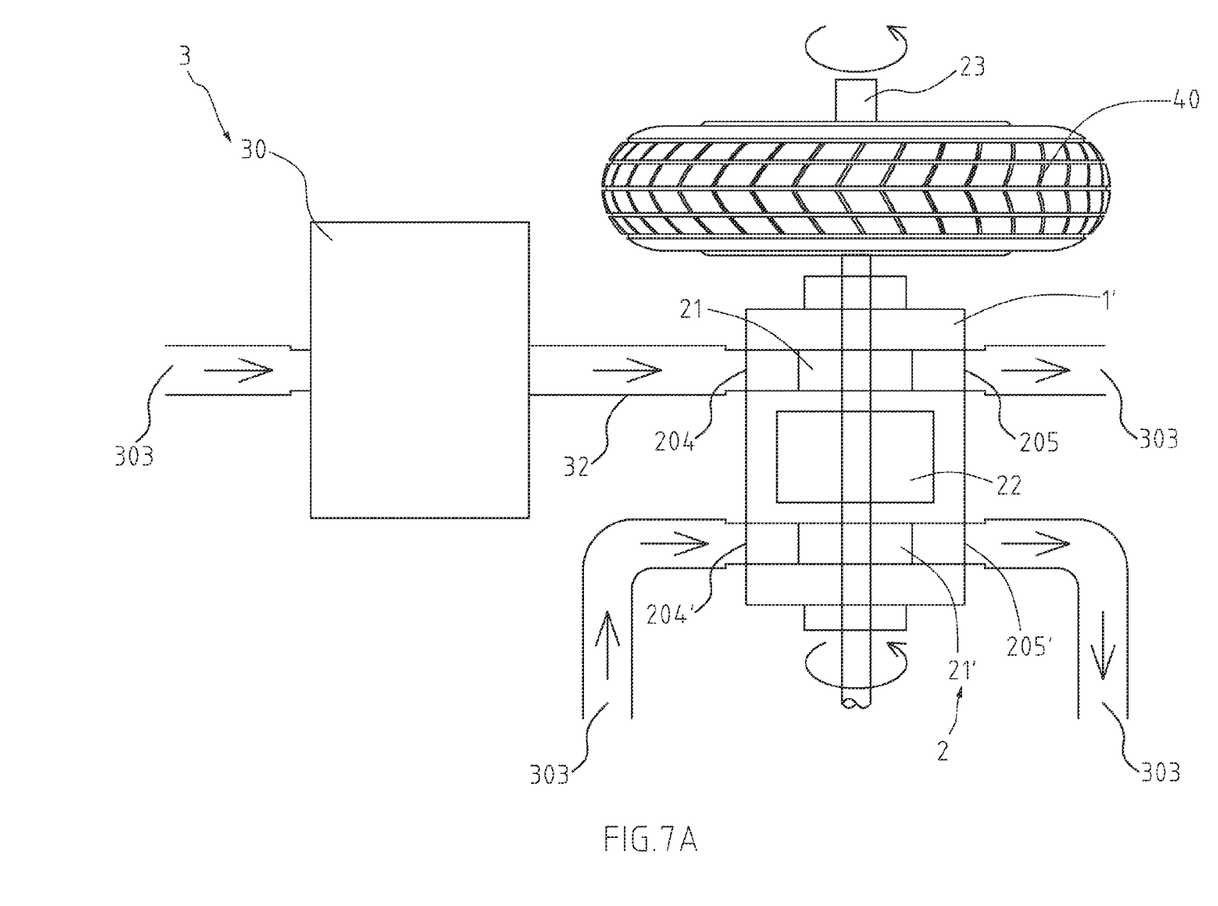
FIG. 7A is a schematic view illustrating the third embodiment such that the connecting pipe is parallel connected and applied to power transmission of vehicle.
Figure 7B:
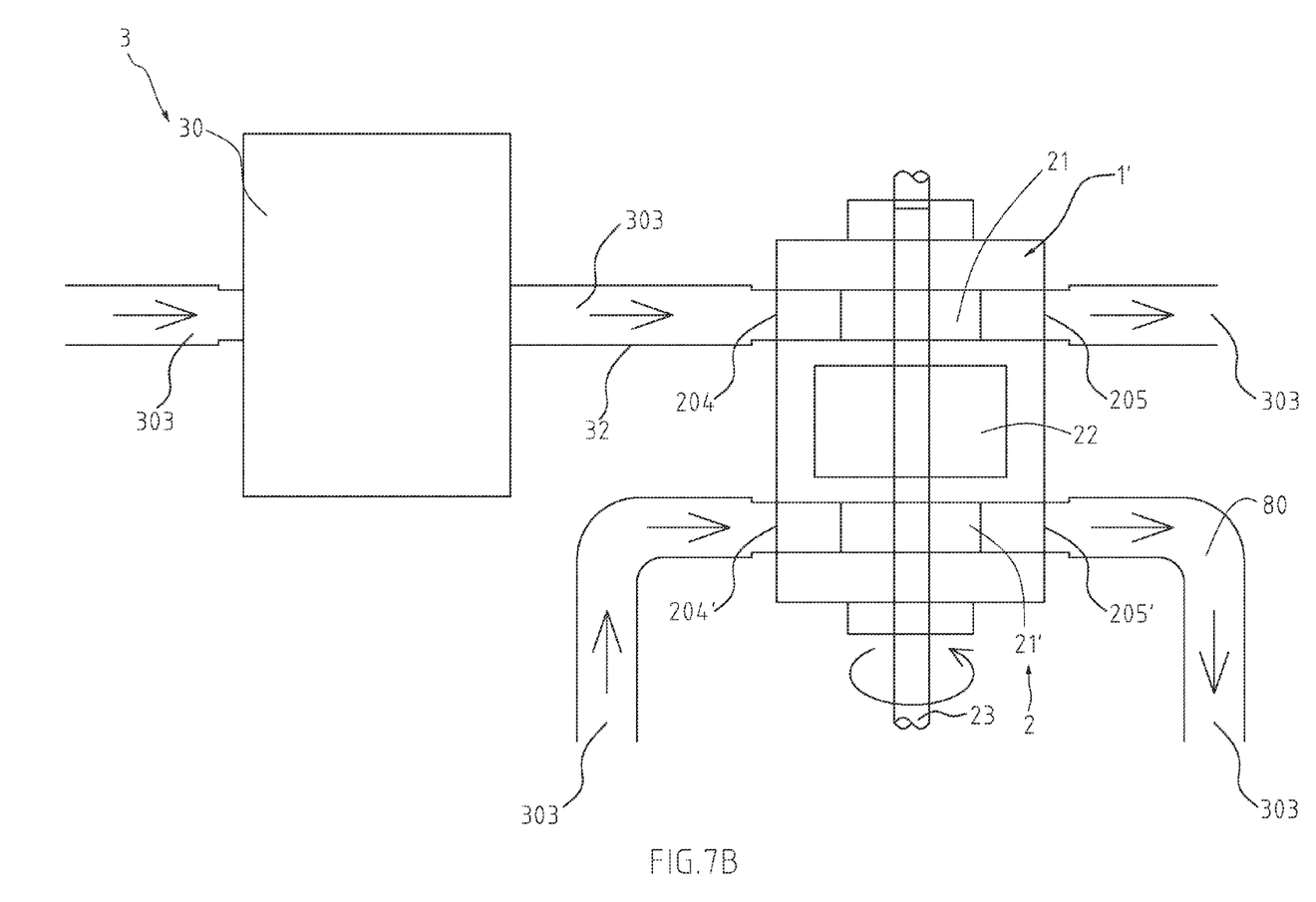
FIG. 7B is a schematic view illustrating the third embodiment such that the connecting pipe is parallel connected and applied to power transmission of fans.

Please referring to FIGS. 7A and 7B, as shown in FIG. 7A as parallel connection centered at the inlet 204,204' and the outlet 205,205', when the power equipment 30 transmits the working fluid 303 via the inlet 204 to the pair of rotors 21, the pressure of the pair of rotors 21 is determined by the working fluid 303 entered based on the amount of the load. In other words, when a vehicle remains stationary, the friction force between tires and road keeps in the maximum, and volume of the body 201 that accommodates the first pair of rotors 21 is changeless before the first pair of rotors 21 rotates. The working fluid 303 now begins to be continuously pushed into the body 201 having a constant volume. With the pressure inside the body 201 getting higher, the force acting on surface of the first pair of rotors 21 gets larger, and accordingly, the normal force that initiates the radial motion of the first pair of rotors 21 thus gets larger. As the normal force being larger than the static friction force between the tires 40 and road, the tires 40 begins to rotate (that is, the tires 40 begins to do work). Meanwhile, the volume of the body 201 that accommodates the pair of rotors 21 begins to expand, while the pressure thereof begins to drop down; as thus, the energy previously stored at high pressure is supplied for the rotation of tires 40 as work. Therefore, when the working fluid 303 flows via the inlet 204 to the outlet 205, the pressure goes down to 1 atm., which means the energy has completely outputted to the tires 40, so the first pair of rotors 21 of the present invention utilized for power transmission are designed to avoid the residual pressure at the outlet 205 to make sure that the energy is outputted completely. Even so, there is still some energy that does not be supplied to the tires 40, whereas it remains on the working fluid at the outlet 205 next to the first pair of rotors 21. When the power equipment 30 transmits the working fluid 303 via the inlet 204 to the second pair of rotors 21' which can be applied to, for example, fluid radiator fans of an auto radiator, the power transmission can be implemented effectively by transmitting the working fluid 303 from the inlet 204' to the outlet 205' with cooperation with the first pair of rotors 21.

Further referring to FIG. 7B, as the second pair of rotors 21' is taken as pump, the pressure of the first pair of rotors 21 is determined by the working fluid 303 according to the amount of lift of the second pair of rotors 21' when the power equipment 30 transmits the working fluid 303 via the inlet 204 to the first pair of rotors 21. In practice, the outlet 205 of the first pair of rotors 21 is connected with the air (i.e., the power equipment 30), while the inlet 204' of the second pair of rotors 21' is connected with water pipe (water tank) on the ground floor of a building and the outlet 205' of the second pair of rotors 21' is connected with pipe of water tank (water tower). When the inlet 204 of the first pair of rotors 21 receives the working fluid 303, the first pair of rotors 21 begins to rotate with ease due to low lift and small load. When the first pair of rotors 21 begins to rotate, the first pair of rotors 21 drives the second pair of rotors 21' and coaxially drives the gear set 22 used for energy transmission and reverse radial motion of the pair of rotors. When the second pair of rotors 21' begins to rotate, water on the ground floor can be transmitted upward. As the number of floors (the load) increased, the lift (the load of the second pair of rotors 21') is also increasing, so that the second pair of rotors 21' needs to increase twisting force from compression by its conjugate rotation, i.e., increase the normal force that the inlet 204 of the first pair of rotors 21 acts on the surface of the first pair of rotors 21, in order to maintain its rotate speed. In other words, the pressure at the inlet 204 of the first pair of rotors 21 needs to be increased to maintain the pressure the outlet 205 of the first pair of rotors 21 at 1 atm., which means that energy from the inlet 204 of the first pair of rotors 21 is completely transformed as shaft work acting on the second pair of rotors 21' to transmitting water upward floor by floor for use.

Centered at the inlet 204,204' and the outlet 205,205' are parallel connection of the shaft adapters 31 that transmits power to tires of vehicle and to water suction pump, as respectively shown in FIGS. 7A and 7B. In other word, the power in accordance with the present invention is transmitted first by the power equipment 30 of the power supply device 3 through the inlet 204,204' and the outlet 205,205' to the power transmission system 1' for power supply to the tires 40 or other equipments (e.g., pump) with the power equipment 30 of the power supply device 3, the first pair of rotors 21, the second pair of rotors 21' and the gear set 22 of the transmission device 2 as auxiliary for power transmission, by which power can also be transmitted continuously and steadily in such a way.

Figure 8A:
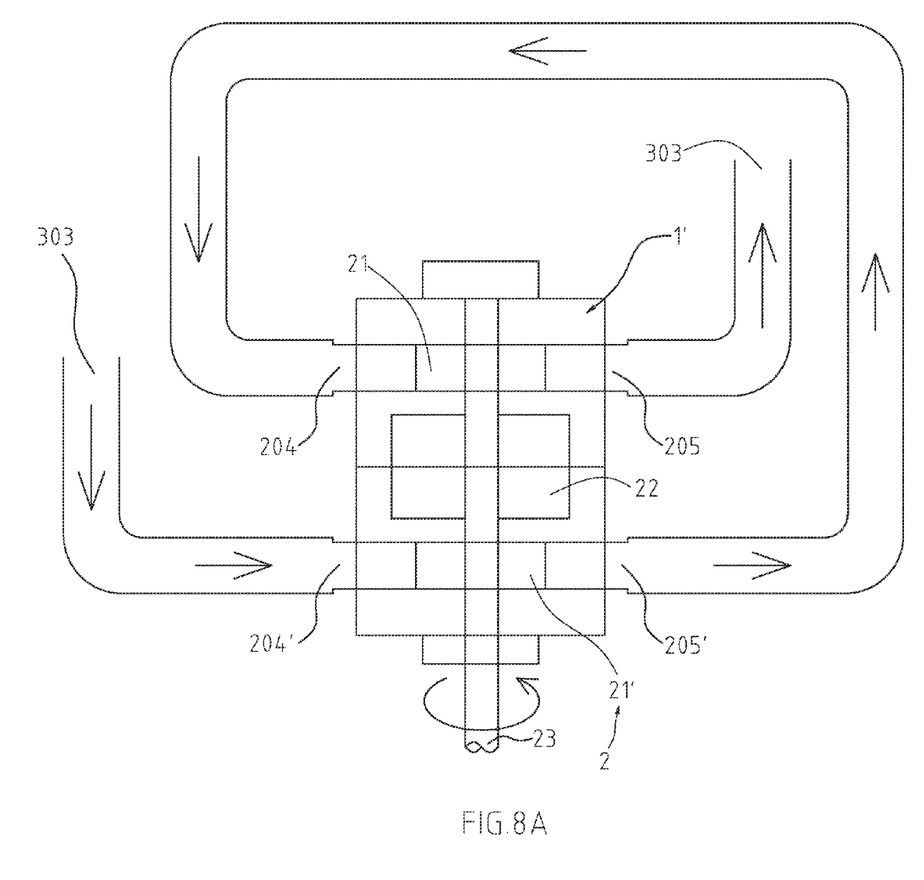
FIG. 8A is a schematic view illustrating the fourth embodiment such that the connecting pipe is series connected.
Figure 8B:
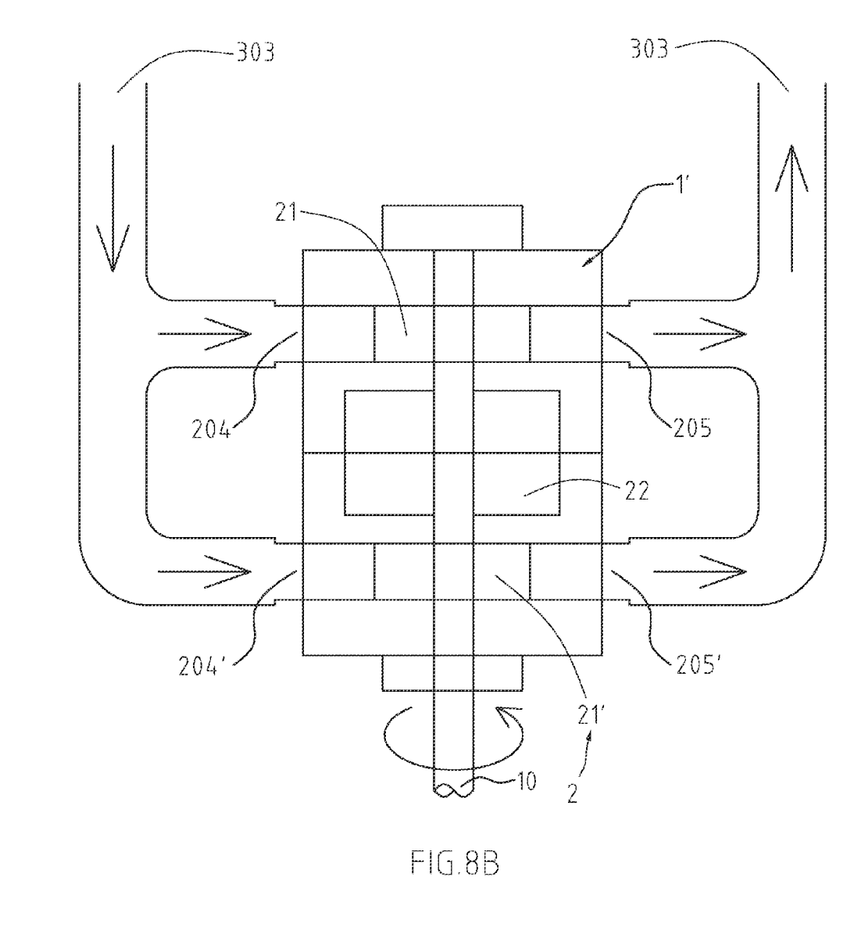
FIG. 8B is a schematic view illustrating the fourth embodiment such that the connecting pipe is series connected.

Please referring to FIGS. 8A and 8B, similarly, power transmission system of the present invention comprises two of the pair of rotors 21,21' and the gear set 22 of the transmission device 2 with the working fluid 303 as auxiliary for power transmission; the two of the pair of rotors 21,21' pivotally connected with each other in series by the shaft adapter 31 centered at the inlet 204,204' and the outlet 205,205', by which power can also be transmitted continuously and steadily in such a way.

It is understood that the invention may be embodied in other forms within the scope of the claims. Thus the present examples and embodiments are to be considered in all respects as illustrative, and not restrictive, of the invention defined by the claims.

What is claimed is:

1. A power transmission system comprising:
a transmission device, and a power supply device which powers the transmission device;
wherein the transmission device comprises at least one cavity and a transmission shaft, the at least one cavity being disposed on the transmission shaft, the at least one cavity each having an inlet and an outlet and being mounted therein with a pair of rotors and a gear set, the transmission shaft penetrating through each cavity and pivotally connecting with the pair of rotors and the gear set, the inlet and the outlet of each cavity being located at opposite sides of the transmission shaft to form a fluid path perpendicular to the transmission shaft;
wherein the power supply device comprises a power equipment and a connecting pipe, the connecting pipe being connected between the power equipment and the at least one cavity, the power equipment transmitting a working fluid to the inlet and recycling the working fluid from the outlet through the connecting pipe connected to the at least one cavity; and
wherein the working fluid flowing along the fluid path perpendicular to the transmission shaft provides a normal force to the pair of rotors and an increasing pressure inside each cavity to enable the pair of rotors to whirl and the transmission shaft to rotate for outputting work, wherein a magnitude of the work outputted is proportional to an amount of the at least one cavity coaxially disposed on the transmission shaft so that the at least one cavity coaxially disposed on the transmission shaft is capable of optimizing power transmission for the transmission shaft.

2. The power transmission system of claim 1, wherein the pair of rotors comprises a rotor and a conjugate rotor intermeshed with each other, and the gear set comprises a first gear and a second gear intermeshed with each other.

3. The power transmission system of claim 1, wherein the power supply device further comprises shaft adapters being respectively assembled on the inlet of the cavity and the outlet of the cavity, the connecting pipe being connected between the power equipment and the shaft adapters.

4. The power transmission system of claim 2, wherein the rotor and the conjugate rotor are tooth rotors.

5. The power transmission system of claim 4, wherein the rotor and the conjugate rotor have a same tooth number.

6. The power transmission system of claim 2, wherein the first gear and the second gear of the gear set are sour gears or helical gears.

7. The power transmission system of claim 1, wherein the power equipment employs either hydraulic power or pneumatic power and includes motor, fluid storage tank and pump.

8. The power transmission system of claim 1, wherein the power equipment employs either hydraulic power or pneumatic power and includes motor, fluid storage tank and fluid compressor.

* * * * *